Figure 2:
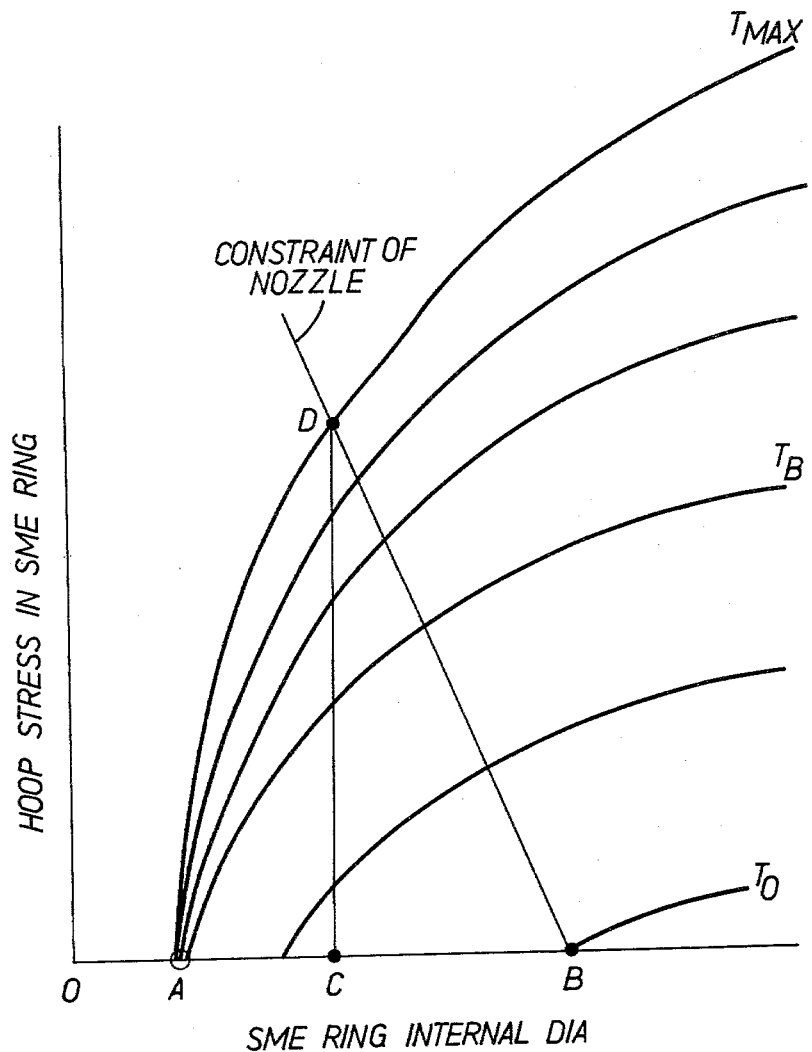

United States Patent [19]

Hart

[11] 4,253,611
[45] Mar. 3, 1981

[54] JET NOZZLES

[75] Inventor: William B. Hart, Ipswich, England

[73] Assignee: Delta Materials Research Limited, London, England

[21] Appl. No.: 42,117

[22] Filed: May 24, 1979

[30] Foreign Application Priority Data

Jun. 5, 1978 [GB] United Kingdom ............... 2634278
Dec. 29, 1978 [GB] United Kingdom ............. 50277/78

[51] Int. Cl.$^3$ ............................................. B05B 1/00
[52] U.S. Cl. ........................... 239/602; 239/DIG. 19; 261/44 C
[58] Field of Search ............ 239/DIG. 19, 602, 397.5, 239/75; 236/93 R, 101 R, 101 D; 73/363.9; 137/468; 261/39 R, 39 B, 44 B, 44 C, 121 B

[56] References Cited

U.S. PATENT DOCUMENTS

| 2,062,496 | 12/1936 | Brokel | 261/44 B |
|---|---|---|---|
| 2,966,170 | 12/1960 | Raulins | 236/93 R X |
| 3,322,345 | 5/1967 | Getz | 236/93 |
| 3,387,830 | 6/1968 | McIlroy | 261/121 B |
| 3,408,816 | 11/1968 | Stein | 239/75 X |
| 3,489,353 | 1/1970 | Annen | 239/602 X |
| 3,653,642 | 4/1972 | Lawrence | 261/44 C |
| 3,684,257 | 8/1972 | Lawrence | 261/44 C X |
| 3,857,908 | 12/1974 | Brown et al. | 236/93 R |

Primary Examiner—Robert B. Reeves
Assistant Examiner—Gene A. Church
Attorney, Agent, or Firm—Lee & Smith

[57] ABSTRACT

A jet nozzle has the effective dimensions of its outlet orifice automatically controlled by use of a shape memory effect (SME) material. The nozzle itself may be made wholly or partly of SME material or it may be controlled in position relative to its metering needle by a temperature sensitive actuator incorporating a device of SME material.

5 Claims, 8 Drawing Figures

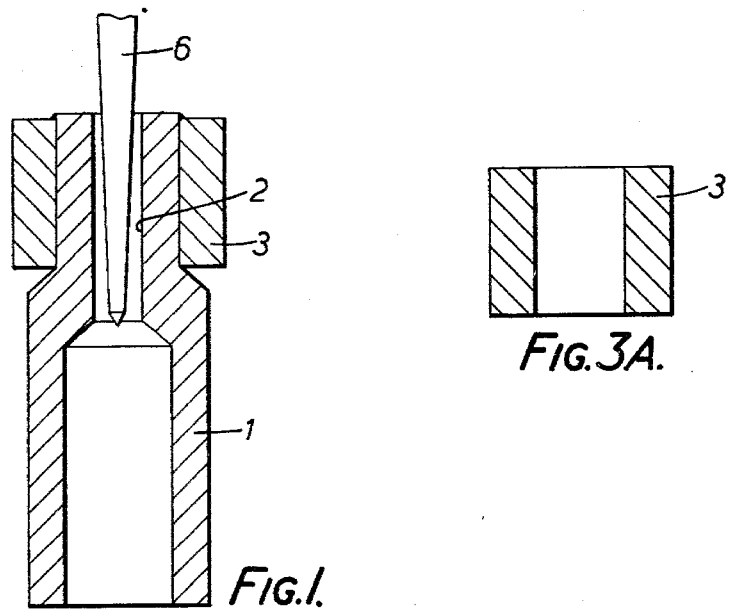
FIG.1.
FIG.3A.
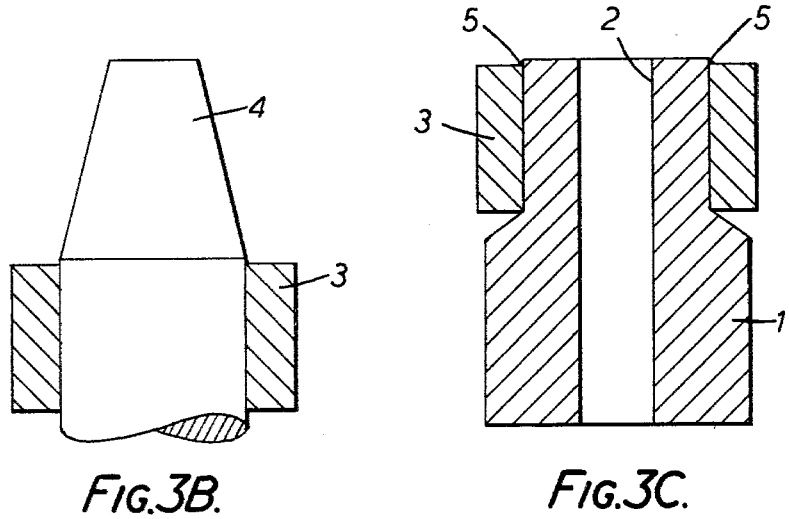
FIG.3B.
FIG.3C.

JET NOZZLES

This invention relates to jet nozzles particularly, but not exclusively, for use in carburettors of internal combustion engines, and to methods of making those nozzles.

In most carburettors and fuel/air metering systems, the fuel is supplied to a jet nozzle, in the outlet orifice of which is located a displaceable tapered metering needle, which controls the rate at which fuel is drawn into the mixing chamber. In such an arrangement, difficulty is experienced due to the change of viscosity of the fuel with temperature: as the temperature rises, the viscosity of the fuel falls so that, for the same needle setting, the rate of flow increases. A nozzle which is designed to give an adequate flow rate at low temperature thus supplies the fuel at a higher rate, when the temperature increases. That in turn results in wasteful utilisation of the fuel and uncceptable exhaust emission. A number of complicated expedients have been proposed with the aim of maintaining the flow rate uniform irrespective of temperature, but none has been entirely satisfactory.

One aspect of the present invention resides in a jet nozzle, the effective dimensions of the outlet of which are automatically controlled by use of a shape memory effect (SME) material having a transition temperature range, in which the modulus of elasticity varies progressively and significantly with change of temperature in a reversible manner. If an element of SME material, which is usually a heat-treated alloy, is deformed at a temperature below the transition temperature range, it will restore progressively towards the undeformed condition as the temperature is raised through the range. The phenomenon is reversible, in that a subsequent lowering of the temperature produces a return towards the deformed condition. The preferred SME material in the present invention is a copper-zinc-aluminium alloy.

In one form of the invention, the nozzle is constituted at least in part by SME material which is so conditioned and arranged that the dimensions of the outlet orifice of the nozzle varies with variation, within the transition temperature range, of the temperature to which the SME material is subject, but in the opposite direction. When applied to a carburettor, the material is chosen to have a transition temperature range encompassing the normal operating temperatures of the fuel and the orifice is dimensioned so as to have, in the undeformed state, an orifice size suitable to the fuel when at a temperature at the top of the transition temprature range; it is then deformed to have an orifice size suitable for fuel at the bottom of that range.

In another form of the invention the jet nozzle is mounted for movement axially of the orifice under control of an SME element, and has a tapered metering needle in the outlet orifice. Change of temperature within the transition temperature range of the SME material then results in movement of the orifice axially of the needle and a variation in the discharge rate.

While the invention is primarily directed to use in a carburettor, it can also be employed in othe situations where changes in viscosity with temperature are encountered, as in the extrusion of filaments.

Figure 4:
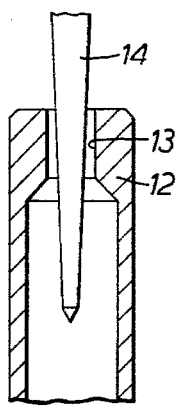
Figure 5:
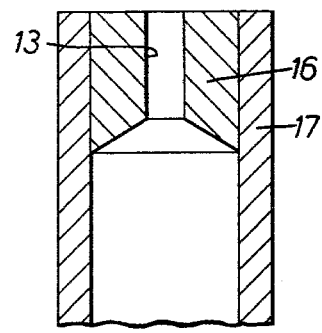
Figure 6:
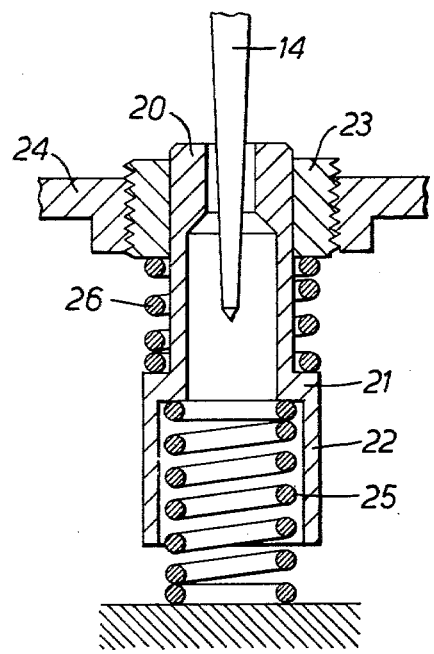

The invention will be more readily understood by way of example from the following description of jet nozzles in accordance therewith, reference being made to the accompanying drawings, in which FIG. 1 is an axial section of a jet nozzle construction, FIG. 2 illustrates the operation of the jet nozzle construction of FIG. 1, FIGS. 3(A), (B) and (C) show schematically successive stages of making the SME ring of FIG. 1, FIGS. 4 and 5 shows other forms of carburettor nozzle construction where the outlet orifice is controlled by SME material, and FIG. 6 illustrates a nozzle which is automatically moved axially according to temperature.

FIG. 1 illustrates a jet nozzle construction which can be used in a carburettor and which responds automatically to fuel temperature changes to vary the diameter of the outlet orifice and thereby to maintain the flow rate through the nozzle orifice approximately constant regardless of temperature-induced variations in viscosity.

The construction consists of a jet nozzle 1, made in conventional manner in a suitable metal and having a bore which reduces at one end to an outlet orifice 2 which receives in use a metering needle 6 in known manner. The part of the nozzle 1 surrounding the outlet orifice 2 is encompassed by a ring 3 of an SME alloy, which contracts on heating in its transition temperature range, and expands on cooling, in order to vary the hoop stress applied to the nozzle 1 and hence the diameter of the outlet orifice 2. The temperature of the SME ring 3 varies with the temperature of the fuel passing through the nozzle owing to heat conduction through the nozzle 1, and the SME material is chosen to have a transition temperature range which covers the normal fuel temperatures met with in practice in a carburettor of an internal combustion engine, usually 30° C. to 70° C. Then, with rise in fuel temperature, the nozzle orifice is reduced in diameter to compensate for the fall in fuel viscosity and to maintain the rate of flow of fuel more or less constant, for a fixed position of the metering needle 6.

The SME ring 3 is forced to work against the thermally inactive nozzle 1 and operates at high stress, at least at the upper reaches of the transition temperature range. As a consequence, as will be explained subsequently, significant changes in the bore of the outlet orifice 2 occur over the entire extent of the transition temperature range.

FIG. 2 illustrates the variation in the hoop stress of the SME ring 3 with the internal diameter of that ring. The lines T are a family of curves showing the variation of hoop stress with internal diameter at various temperatures. It will be observed that, at zero or near zero hoop stress, the internal diameter varies between B and A as the temperature varies between $T_O$ and $T_{MAX}$, the practical extremities of the transition temperature range of the SME material. However, because of the bunching of the characteristics adjacent A at the higher end of the transition temperature range, there is little significant change in ring diameter with temperature between an intermediate temperature value $T_B$ and $T_{MAX}$; significant dimensional changes of the ring occurs only in the limited temperature range of $T_O$ and $T_B$ which is then the effective range over which control is exerted. Because the transition temperature range of an SME material is itself limited, the more limited range $T_O$ to $T_B$ may be insufficient to encompass the range of temperatures of the fuel.

The line DB represents the constraint of the jet nozzle 1 (FIG. 1), the non-SME nozzle acting as a stiff spring acting in opposition to the ring 3. Changes of the ring internal diameter now occur along the line BD, the diameter for any temperature being found by the intersection of that line with the particular stress/strain characteristic of the SME material for that temperature. The variation in internal diameter of the ring is reduced to BC, but the active temperature range, i.e. the temperature range over which significant dimensional change occurs with temperature, is increased and is now from $T_O$ to $T_{MAX}$. Accordingly, the jet nozzle construction of FIG. 1 is given an enlarged active temperature range compared with one in which the SME material works at low stress. The high stress level at which the SME material works also reduces the hysteresis in the dimensional change/temperature characteristic of the SME material.

The amount of change in the diameter of the outlet orifice 2 for a given change of temperature within the transition range is different from the change in the internal diameter of the ring 3. FIGS. 3A—3C illustrate the successive stages for achieving the desired change in diameter of the outlet orifice.

As shown in FIG. 3A, a slug of SME alloy is machined to the initial dimensions and heat treated to fix the internal diameter $d_O$ to the value represented by the origin O in FIG. 2. After the ring has cooled to $T_O$ or below, the ring 3 is expanded with a taper mandrel 4, as shown in FIG. 3B, to bring the ring internal diameter to $d_B$, the value corresponding to the point B of FIG. 2; with the mandrel in position the temperature is cycled between values below the practical lower extremity $T_O$ of the transition temperature range, and above the practical upper extremity $T_{MAX}$ of that range. Next, (FIG. 3C) the temperature is lowered to below $T_O$ and placed around the outlet orifice of the jet nozzle 1. The ring is retained, as by rivetting the ring to the end of the nozzle at 5. Finally, the bore of the outlet orifice 2 is machined to give the required orifice diameter for a temperature $T_O$. Alternatively, the nozzle 1 may be manufactured to have an external diameter at the orifice of $d_B$ and the required or nominal orifice bore diameter.

It is not necessary for the SME element to be in the form of a ring 3 as shown in the Figures. For example, the SME element may be in the form of a split ring, or a helical coil. Further, the internal bore of the ring 3 may be tapered and seated on a complementary surface of the jet nozzle 1; in that case, the change of internal diameter 2 with temperature may be varied by adjustment of the ring axially of the nozzle.

The nozzle 1 is preferably made of stainless steel, but may be made of some other suitable metal or alloy such as brass or bronze. In the latter case, the constraint characteristic (BD in FIG. 2) may depart from the straight line shown.

While the construction shown in FIG. 1 is preferred, the jet nozzle may have other forms, as shown in FIGS. 4 and 5, for example.

In FIG. 4, the jet nozzle 12 has an outlet orifice 13, which is partly closed by a tapered metering needle 14 movable axially under external control in order to vary the rate at which fuel is drawn through the orifice 13. The entire jet nozzle 12 is made of an SME alloy with the properties described above and is treated as described below so that the diameter of the orifice 13 decreases and increases as the fuel temperature increases and decreases respectively through the transition temperature range, which is chosen to include the variation of the nozzle temperature experienced in use. At a low temperature, the orifice diameter 13 is thus relatively large and is suitable for flow of the fuel at high viscosity. As the temperature increases, the orifice 13 decreases in diameter to maintain substantially the same flow rate regardless of the decrease of viscosity of the fuel.

In the manufacture of the jet nozzle 12, a nozzle blank as shown in FIG. 4 is machined from SME alloy to have a diameter $D_{MAX}$ desired for the orifice at a temperature adjacent the highest temperature of the transition temperature range. The blank is heat-treated either before or after machining to bring it into condition for the martensitic transformation from which the shape memory effect is derived. Next the nozzle blank is cooled to a temperature below the transition temperature range ($<T_O$) and a ball bearing or a tapered drift is forced through the orifice to form the SME material. The diameter of the ball, or the maximum diameter of the drift, has a diameter $D_O$, corresponding to the diameter required of the orifice at a temperature at the bottom of the transition temperature range. On removing the ball bearing or drift, the nozzle displays the required variation in diameter between $D_O$ and $D_M$ as the ambient temperature is varied through the transition temperature range. If elasto/plastic recovery of the SME material occurs after the ball bearing or drift is removed from the nozzle, the diameter to which the nozzle is initially machined should be less than $D_M$ and the diameter of the ball bearing or drift slightly larger than the $D_O$.

As distinct from the construction of FIG. 1, the nozzle 12 of FIG. 4 is subject to no restraint, i.e. the hoop stress in FIG. 2 is always zero, and the bore diameter of the nozzle varies with temperature between A and B of FIG. 2. At the higher end of the transition temperature range ($T_O$ to $T_{MAX}$) the rate of change of bore diameter with temperature is relatively small. For that reason, the transition range should be chosen so that the part of the range from $T_O$ to $T_B$ encompasses most of the variation in temperature encountered in use.

In the nozzle construction illustrated in FIG. 5, a nozzle bush 16 of SME material is mounted in a nozzle holder 17, the latter being made of a material not exhibiting the SME effect. The nozzle bush 16 is made in the manner described above for the nozzle 12.

Instead of using SME material to cause the nozzle bore diameter to be reduced with rise in temperature, the nozzle can be adjusted in axial position relative to the needle 14 to bring about the same result, the position of the nozzle being under the control of a temperature-sensitive actuator employing an element of SME material. Thus, as shown in FIG. 6, the jet nozzle 20, which is not made of SME material, is displaceable axially of the metering needle 14 with variation in temperature. The nozzle 20 is formed with a shoulder 21 forming a lower skirt 22 of greater dimensions than the upper part of the nozzle. The nozzle 20 is slidably mounted in a nut 23, adjustably threaded in a mounting 24, and is seated on a helical spring 25, made from an SME alloy and acting between the shoulder 21 and a fixed surface. SME spring 25 is biased by a steel helical spring 26 acting between the nut 23 and the shoulder 21; by adjustment of the nut 23 the loading of spring 26 can be adjusted.

As before, the material of the SME spring 25 has a transition temperature range encompassing the variation in ambient temperature to which the jet is subject. The nozzle is held in a position determined by equilibrium between the forces applied by the two springs 25, 26. As the temperature varies through the transition temperature, the stiffness of spring 25 increases to cause the equilibrium position to change upwardly and thereby decrease the clearance between the orifice of nozzle 20 and the metering needle 14. Similarly, a fall in temperature is accompanied by a decrease in the stiffness in spring 25, a fall in the equilibrium position of the nozzle 20 and an increase in the clearance between the nozzle and the needle 14. The effective dimensions of the jet is thus controlled inversely with temperature to maintain a substantially constant flow of fuel through the orifice.

As will be appreciated the temperature sensitive actuator of FIG. 6 (the SME spring 25 and the opposing, non-SME, bias spring 26) operates as described in FIG. 2, with the modification that their vertical axis represents vertical force. The line BD now represents the stress/strain characteristic of spring 26 and the family of curves the stress/strain characteristics of the SME spring 25 at various temperatures. For the reasons given in relation to FIG. 1, the FIG. 6 construction gives a significant rate of jet change with temperature, even at the upper end of the transition temperature range ($T_O$ to $T_{MAX}$).

For the components made of SME alloy (the ring 3 of FIGS. 1 and 3, the nozzle 12 of FIG. 4, the internal ring 16 of FIG. 5, and the spring 25 of FIG. 6) it is preferred to use an alloy of copper, zinc and aluminium, the relative porportions of which by weight are approximately as follows:

Copper—70%
Aluminium—4%
Zinc—26%

The precise proportions of the constituents are chosen according to the transition temperature range required.

I claim:

1. A jet nozzle comprising
   (a) a nozzle device having an outlet orifice,
   (b) said nozzle device
   (i) including a nozzle member having a passage therethrough leading to said outlet orifice, and
   (ii) being constituted at least in part by a shape memory effect (SME) material having a transition temperature range in which the modulus of elasticity varies progressively and significantly with change of temperature in a reversible manner, said nozzle device including an SME element at least partly circumscribing said nozzle member at least at said outlet orifice and applying to said nozzle member a hoop stress which varies with temperature,
   (c) said SME material is so conditioned and arranged that the dimensions of said outlet orifice vary with variation within the transition temperature range of the temperature to which said SME material is subject, but in the opposite direction.

2. A jet nozzle according to claim 1 in which said SME material is a copper-zinc-aluminium alloy.

3. A jet nozzle comprising:
   (a) a nozzle member having a passage therethrough leading to an outlet orifice;
   (b) a metering needle movable within said orifice to control the effective dimension of said orifice and the rate of flow of liquid from said orifice;
   (c) said nozzle member being itself mounted for movement axially of said needle; and
   (d) a temperature sensitive actuator operatively connected to said nozzle member to control the axial position of said nozzle member;
   (e) said actuator incorporating an element of shape memory effect (SME) material having a transition temperature range in which the modulus of elasticity varies progressively and significantly with change of temperature in a reversible manner;
   (f) said SME material being so conditioned and arranged that said nozzle is moved to vary the effective dimensions of said orifice in response to variation in temperature within said range.

4. A jet nozzle according to claim 3, wherein said actuator comprises
   a spring of SME alloy and
   a non-SME spring, said springs acting oppositely on said nozzle member.

5. A jet nozzle according to claim 4, wherein said SME spring and said non-SME spring are helical compression springs.

* * * * *